(12) United States Patent
Fan et al.

(10) Patent No.: US 6,766,053 B2
(45) Date of Patent: Jul. 20, 2004

(54) METHOD AND APPARATUS FOR CLASSIFYING IMAGES AND/OR IMAGE REGIONS BASED ON TEXTURE INFORMATION

(75) Inventors: Zhigang Fan, Webster, NY (US); Thyagarajan Balasubramanian, Webster, NY (US)

(73) Assignee: Xerox Corporation, Stamford, CT (US)

( * ) Notice: Subject to any disclaimer, the term of this patent is extended or adjusted under 35 U.S.C. 154(b) by 588 days.

(21) Appl. No.: 09/737,513

(22) Filed: Dec. 15, 2000

(65) Prior Publication Data

US 2002/0110283 A1 Aug. 15, 2002

(51) Int. Cl.[7] ................................................. G06K 9/00
(52) U.S. Cl. .................... 382/170; 382/171; 382/172; 382/260; 382/224
(58) Field of Search ................................ 382/170, 171, 382/173, 164, 224, 248, 233, 300, 165, 299, 282, 168, 172, 260, 261, 262, 263, 264, 265, 270, 271, 272, 273; 375/240.21, 240.25; 358/450, 453, 465, 474, 538; 348/14.1, 484

(56) References Cited

U.S. PATENT DOCUMENTS

| 5,548,346 | A | * | 8/1996 | Mimura et al. ............. 348/738 |
|---|---|---|---|---|
| 5,767,978 | A | | 6/1998 | Revankar et al. |
| 5,818,970 | A | * | 10/1998 | Ishikawa et al. ............ 382/248 |
| 6,137,907 | A | * | 10/2000 | Clark et al. ................ 382/180 |
| 6,157,749 | A | * | 12/2000 | Miyake ...................... 382/300 |
| 6,381,364 | B1 | * | 4/2002 | Gardos ....................... 382/173 |
| 6,516,096 | B2 | * | 2/2003 | Yokose et al. .............. 382/248 |
| 6,549,660 | B1 | * | 4/2003 | Lipson et al. ............... 382/224 |
| 6,549,681 | B1 | * | 4/2003 | Takiguchi et al. .......... 382/294 |

* cited by examiner

Primary Examiner—Timothy M. Johnson
Assistant Examiner—Ali Bayat
(74) Attorney, Agent, or Firm—Fay, Sharpe, Fagan, Minnich & McKee, LLP

(57) ABSTRACT

A document processing system and a method for classifying an input image or region thereof as either a synthetic graphic or a natural picture, is disclosed. The system includes an image input subsystem, a processing subsystem for processing image data provided by the image input subsystem, and software/firmware means operative on the processing subsystem for a) low-pass filtering image data representative of the input image or region thereof to produce low-pass filtered pixel values; b) determining a smoothness value for each of a plurality of low-pass filtered pixel values; c) generating histogram data from the smoothness values; d) determining a texture metric for the input image or region thereof from a subset of the histogram data; and e) thresholding the texture metric to classify the input image as either a synthetic graphic or a natural picture.

20 Claims, 3 Drawing Sheets

METHOD AND APPARATUS FOR CLASSIFYING IMAGES AND/OR IMAGE REGIONS BASED ON TEXTURE INFORMATION

BACKGROUND OF THE INVENTION

The present invention relates generally to the document processing art, and more particularly to a method and apparatus for classifying a scanned image or image region as either a synthetic graphic or a natural picture based on texture information obtained from the image or region, and will be described with particular reference thereto.

Document processing systems (DPS) refers to a set of devices that construct, produce, print, translate, store, and archive documents and their constituent elements. Such devices include printers, copiers, scanners, fax machines, electronic libraries, and the like. The present invention addresses situations particularly relevant to printing systems and discusses them as the prime example of a DPS, but the present invention should not be construed to be limited to any such particular printing application. Any DPS is intended to benefit from the advantages of this invention.

Natural pictures differ from synthetic graphics or graphical images in many aspects, both in terms of visual perception and image statistics. Synthetic graphics are usually very smooth (i.e. relatively uniform or linear pixel values) within a given image region or neighborhood, and the edges or boundaries that separate different synthetic graphical regions are typically very sharp (i.e. relatively large difference in local pixel values). Further, synthetic graphics contain textures only in rare cases. On the contrary, natural pictures have regions that are often more noisy and texture rich (i.e. relatively large variation in local pixel values), and generally transition slower from region to region within a natural image.

Information about the origin of a scanned image is usually unavailable to the document processing system. However, in processing scanned images, it is sometimes beneficial to distinguish images from different origins, e.g. synthetic graphics versus natural pictures. For example, in color correction or enhancement, more emphasis is placed on vividness for a synthetic graphical original, while for a natural picture, the focus is more on the naturalness of the image.

Accordingly, it is considered desirable to develop a new and improved method and apparatus for classifying a scanned image or image region as either a synthetic graphic or a natural picture based on texture information, that meets the above-stated needs and overcomes the foregoing difficulties and others while providing better and more advantageous results.

SUMMARY OF THE INVENTION

More particularly, the present invention provides a new and improved method and apparatus for classifying a scanned image or region of an image as either a synthetic graphic or a natural picture, based on texture information for the subject image or region. The present invention analyzes texture features to determine whether a scanned image was originally a synthetic graphic, or a natural picture. A classifier is then generated based on the measurement of texture energy.

In accordance with one aspect of the present invention, a method for classifying an input image or region thereof as either a synthetic graphic or a natural picture, is disclosed. The method includes a) low-pass filtering image data representative of the input image or region thereof to produce low-pass filtered pixel values; b) determining a smoothness value for each of a plurality of low-pass filtered pixel values; c) generating histogram data from the smoothness values; d) determining a texture metric for the input image or region thereof from a subset of the histogram data; and e) thresholding the texture metric to classify the input image as either a synthetic graphic or a natural picture.

In accordance with another aspect of the present invention, a document processing system for classifying an input image or region thereof as either a synthetic graphic or a natural picture, is disclosed. The system includes an image input subsystem, a processing subsystem for processing image data provided by the image input subsystem, and software/firmware means operative on the processing subsystem for a) low-pass filtering image data representative of the input image or region thereof to produce low-pass filtered pixel values; b) determining a smoothness value for each of a plurality of low-pass filtered pixel values; c) generating histogram data from the smoothness values; d) determining a texture metric for the input image or region thereof from a subset of the histogram data; and e) thresholding the texture metric to classify the input image as either a synthetic graphic or a natural picture.

An advantage of the present invention is the provision of a document processing system and a method that classifies an input image or region thereof as either a synthetic graphic or a natural picture for use in downstream image processing.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
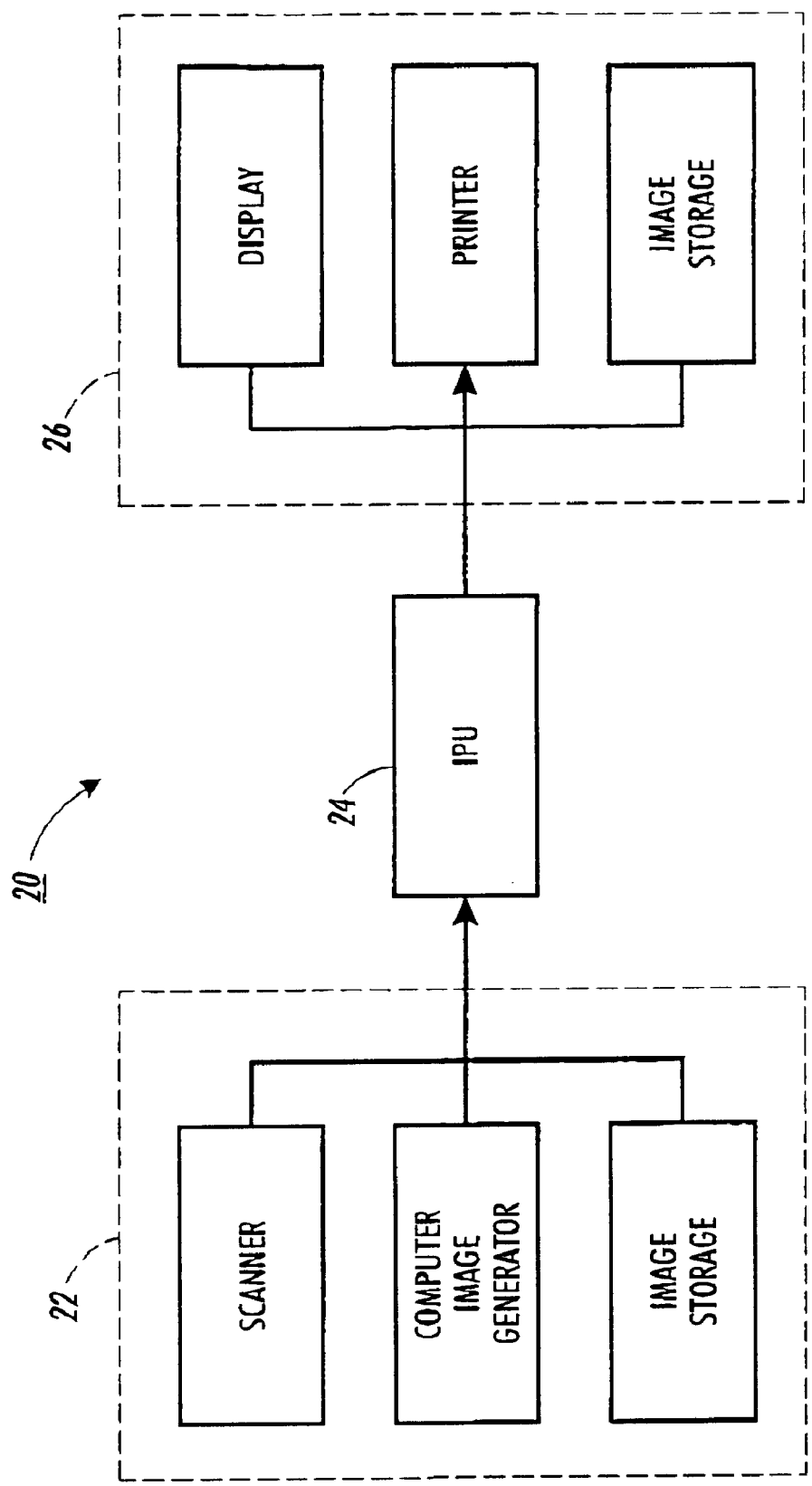
FIG. 1 is a simplified block diagram of an exemplary document processing system (DPS) which incorporates the present invention.

The following is a detailed description of the drawings illustrated in the present invention. In this description, the terms "image data" or "pixels" in the form of video image signals, which may be either analog or digital voltage representations of an image, indicate a representation of an image provided from a suitable source. For example, the image signals may be obtained through line-by-line scanning of an image bearing the original by one or more photosensitive elements, such as an array of charge couple devices commonly referred to as CCDs. Line-by-line scanning of an image bearing the original for the duration of image data is well known and does not form a part of the present invention.

A computer workstation program in accordance with document creation application software or from a data storage device can also derive image data. In content, the original video image signals may be composed entirely of a single image component such as lines, text, low-frequency halftones, high-frequency halftones, contones, or any combination thereof.

Moreover, in describing the present invention, it is assumed that the video signal has a value in a range between 0 and 255. However, any range from the video signal can be utilized in conjunction with the present invention. Furthermore, in the following description, the term "gray level" will be used to describe both black and white and color applications.

Furthermore, in describing the present invention, the term "pixel" will be utilized. This term may refer to an electrical (or optical if fiber optics are used) signal which represents the physical measurable optical properties at a physical definable area on a receiving medium. The receiving medium can be any tangible document, photoreceptor, or marking material transfer medium.

Moreover, the term "pixel" may refer to an electrical (or optical) signal which represents the physically measurable optical properties at a physically definable area on the display medium. A plurality of the physically definable areas for both situations represent the physically measurable optical properties of an entire physical image to be rendered by either a material marking device, electrically or magnetic marking device, or optical display device.

Further, the term "pixel" in the scanning environment, may refer to an electrical (or optical) signal which represents physical optical property data generated from a signal photosensor cell when scanning a physical image so as to convert the physical optical properties of the physical image to an electronic or electrical representation. In other words, in this situation, a pixel is an electrical (or optical) representation of the physical optical properties of a physical image measured at a physical definable area on an optical sensor.

Lastly, the term "pixel" in the rendering environment, may further refer to an electrical (or optical) signal which represents the smallest physical area on a recording substrate that can be rendered. In other words, in this situation, a pixel is an electrical (or optical) representation of the physical spot created by a laser in a laser printed image or the physical spot created by the smallest rendered ink droplet.

With reference now to FIG. 1, an exemplary digital document or image processing system 20 such as a reprographic, xerographic, inkjet, etc. system includes an image input terminal (IIT) 22 having one or more of a scanner, computer image generator, an image storage device, and the like. Thus, an input document can be scanned into the system 20, can be sampled and digitized using a digital camera, frame grabber, or other digitizing device, or can be stored on a storage medium such as RAM, ROM, hard drive, magnetic tape, floppy disk, CD, DVD, etc.

When scanned, the input document can be sampled at any resolution, such as 400 samples per inch (spi) or 600 spi, and stored in image buffers or registers as a single, monochromatic bitmapped separation, in the case of a black and white document or image, or as a plurality of monochromatic bitmapped separations representing any one of numerous known color models or spaces such as the RGB, CMY, CMYK, HSI, YES, CIELAB, etc., in the case of a color document or image.

In the RGB color space, a color input document is digitally represented with three data bytes per pixel, where each byte represents the gray scale intensity of one of the primary color components (red, green, blue) of the color input image. This allows each pixel to span a range of gray-scale values from $0_{10}$ (black) to $255_{10}$ (white). In the case of the CIELAB color space, a color input document is digitally represented in three dimensions according to a lightness or luminance value (represented on the L* axis), and two chrominance values, a redness-greenness value (represented on the a* axis), and a yellowness-blueness value (represented on the b* axis).

It is recognized that any luminance-chrominance color space is freely convertible into any other luminance-chrominance color space. Thus, it is not intended that the present invention be limited to any particular color space. Further, it is contemplated that the input document can be represented with any number of bits per sample, and the stored binary numbers can correspond to parameters other than gray scale intensity, luminance, chrominance, etc. Regardless of pixel values, the location of each pixel in the individual separation bitmaps is defined in terms of a row (m) and column (n).

The digital image data from the image input terminal 22 is input to an image processing unit (IPU) 24 where digital image processing in accordance with the present invention is performed. That is, the image processing unit 24 includes a processor or controller that is programmed to classify the entire scanned input image or a region thereof as either a synthetic graphic or a natural picture. As indicated, such information is useful in performing one or more downstream image processing operations, such as color correction or enhancement, on the input document.

The image processing unit 24 may be provided by any suitable electronic computing apparatus such as one or more programmed general purpose computers, dedicated electronic circuits, or any other suitable electronic circuit means. The image processing unit 24 outputs processed digital image data in a suitable format to an image output terminal (IOT) 26 having one or more of a printer, a visual display, an image storage device, and the like. Suitable apparatus for digital image input, image processing, and/or output include the Pixelcraft 7650 Pro Imager Scanner, XEROX DocuTech Production Printing System scanners, the XEROX 5775 digital color copier, the XEROX 5760 and 5765 Majestik digital color copiers, or any other suitable digital color scanner and/or copier.

With one or more monochromatic, bitmapped separations representing the input document or image stored as described above, an image classification routine of the present invention can be executed in the IPU 24 to classify the entire scanned input image or a region thereof as either a synthetic graphic or a natural picture. It is contemplated that one or more conventional upstream image processing operations such as halftone descreening, image segmentation, etc. can already have been performed on the image data prior to execution of the classification routine.

Figure 2:
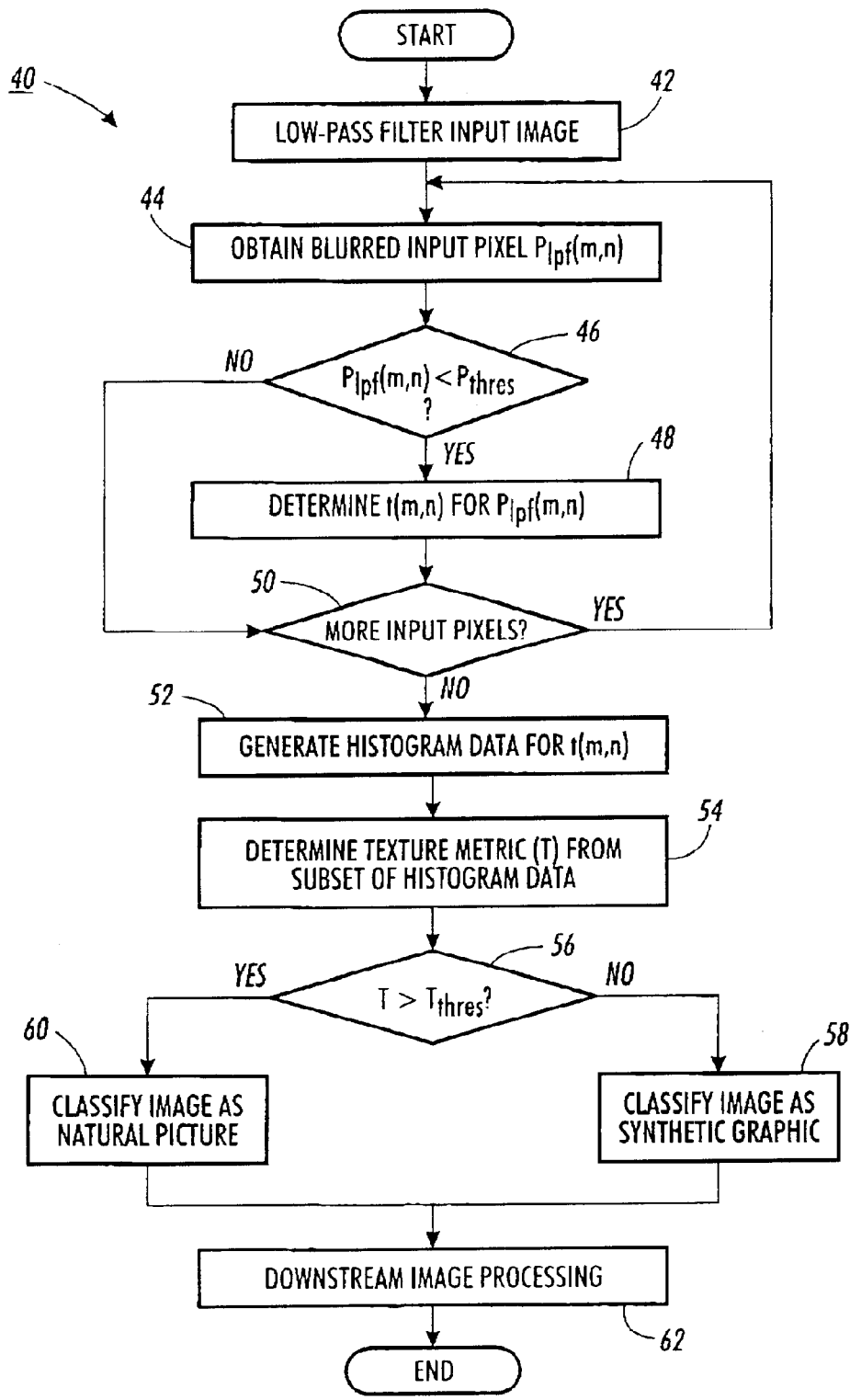
FIG. 2 is an operational flowchart for classifying a scanned image or image region as either a synthetic graphic or a natural picture in accordance with the present invention.

With reference now to FIG. 2, the classification routine 40 begins by low-pass filtering the single, monochromatic bitmapped separation, in the case of a black and white input image, or by low-pass filtering the luminance separation (e.g. the L separation in the CIELAB color space), in the case of a color input image (step 42). In the case of color input images, the luminance separation or channel is selected because it generally contains most of the texture information for the image. As is well-known in the art, low-pass filtering or averaging reduces possible halftone noise (when the input document is a halftoned image) and/or other image artifacts by blurring or otherwise smoothing the image data.

It should be appreciated that the digital image data can be conventionally low-pass filtered or averaged in either the frequency domain or the spatial domain to remove or reduce the high spatial frequency components of the input image. For example, a spatial domain or area processing technique such as convolution uses an original, input, or source pixel value as well as the pixel values around it to generate a corrected (i.e. low-pass filtered) or output pixel value. A convolution is merely a weighted sum of pixel values in a neighborhood surrounding the input pixel. The weights are determined by a 2D W×W matrix generally referred to as a convolution mask, kernel, or window. A designated matrix center pixel corresponds to an output pixel that is generated as a result of the low-pass filtering step.

A sliding convolution window centers on each pixel in the original separation and pixelwise generates new low-pass filtered output pixel values. The new pixel values are each computed by multiplying each original pixel value in the neighborhood with the corresponding weight in the convolution mask and summing these products. The new or output pixel values are stored separately from the original pixel values within a frame buffer or memory within the IPU 24.

It is contemplated that the averaging step can be accomplished within non-overlapping blocks of image data. Effectively, the averaging or smoothing is performed on image data that is subsampled by a factor of W in each direction. By way of example, a suitable 4×4 convolution mask with constant coefficients or weights for low-pass filtering subsampled image data is:

| | | | |
|---|---|---|---|
| 1/16 | 1/16 | 1/16 | 1/16 |
| 1/16 | 1/16 | 1/16 | 1/16 |
| 1/16 | 1/16 | 1/16 | 1/16 |
| 1/16 | 1/16 | 1/16 | 1/16 |

Thus, the result of the low-pass filtering step 42 is to generate low-pass filtered image data that is separate from the original image data.

With continued reference to FIG. 2, the resulting low-pass filtered image data is processed on a pixel-by-pixel basis beginning with a first blurred, smoothed, or low-pass filtered pixel value $P_{lpf}(m,n)$ from the low-pass filtered image data generated in step 42 (step 44). If the pixel value $P_{lpf}(m,n)$ does not represent a "white" pixel (e.g. having a gray-scale intensity value of about $255_{10}$) (step 46), then a smoothness value (t) for the pixel $P_{lpf}(m,n)$ is determined from the following equation (step 48):

$$t(m,n) = |P_{lpf}(m,n) - ([P_{lpf}(m+d,n) + P_{lpf}(m-d,n) + P_{lpf}(m,n+d) + P_{lpf}(m,n-d)]/4)|, \quad \text{Eq. 1}$$

where (d) is an integer determined by the smoothing filter applied in reducing the halftone noise. Typically, (d) can be selected as 0.5 W for the averaging filter. "White" pixel values are excluded from step 48 to avoid the bias introduced by the paper background. Step 46 can be performed by simply comparing the low-pass filtered pixel value $P_{lpf}(m,n)$ to a threshold $P_{thres}$ having a value in the range of about $245_{10}$ to about $255_{10}$.

Thus, the smoothness value (t) for the pixel $P_{lpf}(m,n)$ is a measure of the absolute difference between the low-pass filtered pixel value $P_{lpf}(m,n)$ and the average of four pixel values proximate the low-pass filtered pixel value $P_{lpf}(m,n)$. In a relatively smooth or constant image region, or in an image region with a relatively linear sweep of pixel values, the smoothness value $t(m,n)$ is zero or a relatively small value because the average of the four neighboring pixels $P_{lpf}(m+d,n)$, $P_{lpf}(m-d,n)$, $P_{lpf}(m,n+d)$, and $P_{lpf}(m,n-d)$ should be approximately equal to the low-pass filtered pixel value $P_{lpf}(m,n)$. However, in the case, where the image region is noisy, the smoothness value $t(m,n)$ is relatively large.

Figure 3:
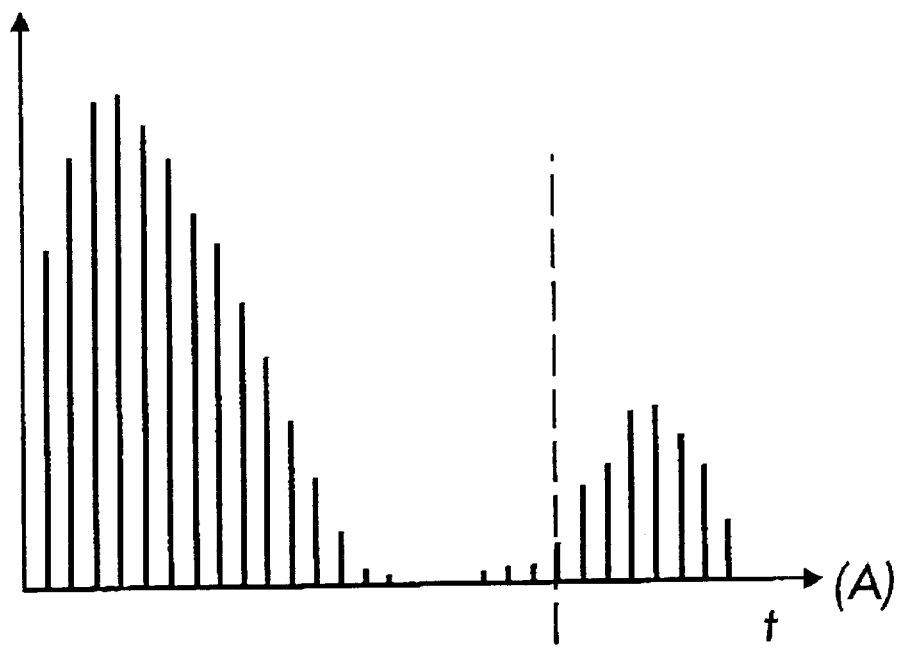
FIG. 3a is an exemplary histogram of smoothness values t(m,n) for a synthetic graphic image.
FIG. 3b is an exemplary histogram of smoothness values t(m,n) for a natural picture.
Figure 3:
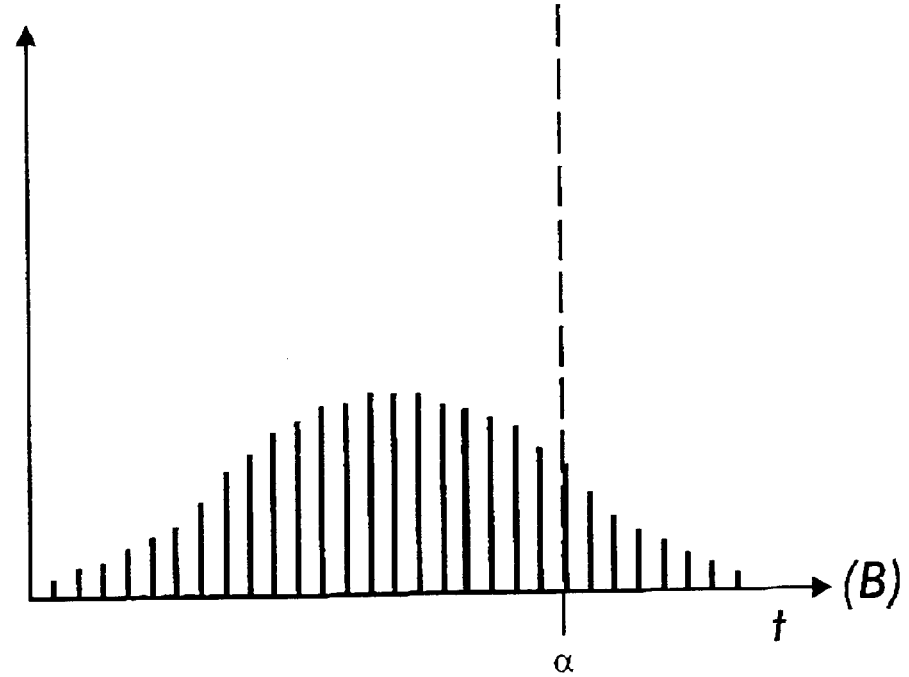

A separate smoothness value $t(m,n)$ is determined for each non-white pixel of the low-pass filtered image data (step 50). Thereafter, a histogram is implemented for the smoothness values $t(m,n)$ that were determined in step 48 (step 52). FIG. 3a is an exemplary histogram of smoothness values $t(m,n)$ for a synthetic graphic, and FIG. 3b is an exemplary histogram of smoothness values $t(m,n)$ for a natural picture. As shown in FIG. 3a, a synthetic graphic is primarily composed of very-low smoothness values $t(m,n)$ and, to a lesser extent, very-high smoothness values $t(m,n)$, with relatively few smoothness values $t(m,n)$ in between. The very-high smoothness values $t(m,n)$ are primarily the result of sharp edges that are characteristic of synthetic graphics.

Thereafter, a texture metric (T) representing the average texture strength of the input image is determined from a subset of the histogram data (step 54). That is, the (M) largest smoothness values $t(m,n)$ are excluded from the texture metric determination, where M=αN, and (N) is the total number of smoothness values $t(m,n)$ and α is a fixed percentage (typically about 15% to about 25%). Excluding up to about 25% of the samples is necessary to eliminate the bias caused by the edge pixels. The texture metric (T) is determined from the remaining histogram data according to the following equation:

$$T = \Sigma t^2(m,n)/(N-M) \quad \text{Eq. 2}$$

The texture metric (T) is then compared to a image classifier threshold $T_{thres}$ (step 56). It has been empirically determined that synthetic graphic images generally have smaller texture metric (T) values (e.g. generally less than about 10 for color images represented in the YES color space). Likewise, natural pictures generally have larger texture metric (T) values (e.g. generally greater than about 50). Thus, an image classifier threshold $T_{thres}$ of about 30 is effective to distinguish between a synthetic graphic and a natural picture.

Once the input image has been classified as either a synthetic graphical image (step 58) or a natural image or picture (step 60), the image data then can be subjected to additional downstream image processing operations based on the image classification, such as color correction and/or enhancement to emphasize vividness, in the case of an image classified as a synthetic graphic, or color correction and/or enhancement to emphasize naturalness, in the case of a natural picture (step 62).

The invention has been described with reference to the preferred embodiment(s). Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A method for classifying an input image or region thereof as either a synthetic graphic or a natural picture, the method comprising:

a) low-pass filtering image data representative of the input image or region thereof to produce low-pass filtered pixel values;

b) determining a smoothness value for each of a plurality of low-pass filtered pixel values;

c) generating histogram data from the smoothness values;

d) determining a texture metric for the input image or region thereof from a subset of the histogram data; and e) thresholding the texture metric to classify the input image as either a synthetic graphic or a natural picture.

2. The method of claim 1, wherein step b) includes determining a smoothness value for each low-pass filtered pixel value below a predetermined threshold.

3. The method of claim 1, wherein step e) includes classifying the input image as a natural image when the texture metric is above a predetermined threshold, and classifying the input image as a synthetic image when the texture metric is below the threshold.

4. The method of claim 1, further including:

f) executing a downstream image processing operation on the image data based on the resulting image classification.

5. The method of claim 1, wherein step a) includes low-pass filtering image data representative of a luminance component of the input image or region thereof to produce low-pass filtered pixel values.

6. A method for classifying an input image or region thereof as one of two different types, the method comprising:

a) low-pass filtering image data representative of the input image or region thereof to produce low-pass filtered pixel values;

b) determining a smoothness value for each of a plurality of low-pass filtered pixel values, wherein each smoothness value t(m,n) is determined from:

$$t(m,n)=|P_{lpf}(m,n)-([P_{lpf}(m+d,n)+P_{lpf}(m-d,n)+P_{lpf}(m,n+d)+P_{lpf}(m,n-d)]/4)|;$$

c) generating histogram data from the smoothness values;

d) determining a texture metric for the input image or region thereof from at least a portion of the histogram data; and e) thresholding the texture metric to classify the input image or region thereof as one of the two different types.

7. A method for classifying an input image or region thereof, the method comprising:

a) low-pass filtering image data representative of the input image or region thereof to produce low-pass filtered pixel values;

b) determining a smoothness value for each of a plurality of low-pass filtered pixel values, wherein each smoothness value is a measure of an absolute difference between a low-pass filtered pixel value and an average of a plurality of other pixel values proximate the low-pass filtered pixel value; and, c) classifying the input image or region thereof based upon at least a portion of the determined smoothness values.

8. A method for classifying an input image or region thereof as one of two different types, the method comprising:

a) low-pass filtering image data representative of the input image or region thereof to produce low-pass filtered pixel values;

b) determining a smoothness value for each of a plurality of low-pass filtered pixel values;

c) generating histogram data from the smoothness values;

d) determining a texture metric for the input image or region thereof from at least a portion of the histogram data; wherein the textue metric (T) is determined from:

$$T=\Sigma t^2(m,n)/(N-M); \text{ and}$$

e) thresholding the texture metric to classify the input image or region thereof as one of the two different types.

9. A method for classifying an input image or region thereof, the method comprising:

a) low-pass filtering image data representative of the input image or region thereof to produce low-pass filtered pixel values;

b) determining a smoothness value for each of a plurality of low-pass filtered pixel values;

c) generating histogram data from the smoothness values;

d) determining a texture metric for the input image or region thereof from a subject of the histogram data excluding histogram data associated with edge pixels from the texture metric determination; and e) thresholding the texture metric to classify the input image or region thereof.

10. A document processing system for classifying an input image or region thereof as either a synthetic graphic or a natural picture, the system comprising:

an image input subsystem;

a processing subsystem for processing image data provided by the image input subsystem; and software/firmware means operative on the processing subsystem for:

a) low-pass filtering image data representative of the input image or region thereof to produce low-pass filtered pixel values;

b) determining a smoothness value for each of a plurality of low-pass filtered pixel values;

c) generating histogram data from the smoothness values;

d) determining a texture metric for the input image or region thereof from a subset of the histogram data; and e) thresholding the texture metric to classify the input image as either a synthetic graphic or a natural picture.

11. The system of claim 10, wherein b) includes determining a smoothness value for each low-pass filtered pixel value below a predetermined threshold.

12. The system of claim 10, wherein e) includes classifying the input image as a natural image when the texture metric is above a predetermined threshold, and classifying the input image as a synthetic image when the texture metric is below the threshold.

13. The system of claim 12, wherein the predetermined threshold has a value of about 30.

14. The system of claim 10, wherein the software/firmware means is further operative on the processing subsystem for:

f) executing a downstream image processing operation on the image data based on the resulting image classification.

15. The system of claim 10, wherein a) includes low-pass filtering image data representative of a luminance component of the input image or region thereof to produce low-pass filtered pixel values.

16. The system of claim 10, wherein the document processing system is a xerographic document processing system.

17. A system for classifying an input image or region thereof as one of two types, the system comprising:
- an image input subsystem;
- a processing subsystem for processing image data provided by the image input subsystem; and
- software/firmware means operative on the processing subsystem for:
  a) low-pass filtering image data representative of the input image or region thereof to produce low-pass filtered pixel values;
  b) determining a smoothness value for each of a plurality of low-pass filtered pixel values, wherein each smoothness value t(m,n) is determined from:

$$t(m,n)=|P_{lpf}(m,n)-([P_{lpf}(m+d,n)+P_{lpf}(m-d,n)+P_{lpf}(m,n+d)+P_{lpf}(m,n-d)]/4)|;$$

c) generating histogram data from the smoothness values;
  d) determining a texture metric for the input image or region thereof from at least a portion of the histogram data; and
  e) thresholding the texture metric to classify the input image or region thereof as one of the two different types.

18. A system for classifying an input image or region thereof, the system comprising:
- an image input subsystem;
- a processing subsystem for processing image data provided by the image input subsystem; and
- software/firmware means operative on the processing subsystem for:
  a) low-pass filtering image data representative of the input image or region thereof to produce low-pass filtered pixel values;
  b) determining a smoothness value for each of a plurality of low-pass filtered pixel values, wherein each smoothness value is a measure of an absolute difference between a low-pass filtered pixel value and an average of a plurality of other pixel values proximate the low-pass filtered pixel value; and,
  c) classifying the input image or region thereof based upon at least a portion of the determined smoothness values.

19. A system for classifying an input image or region thereof as one of the two different types, the system comprising:
- an image input subsystem;
- a processing subsystem for processing image data provided by the image input subsystem; and
- software/firmware means operative on the processing subsystem for:
  a) low-pass filtering image data representative of the input image or region thereof to produce low-pass filtered pixel values;
  b) determining a smoothness value for each of a plurality of low-pass filtered pixel values;
  c) generating histogram data from the smoothness values;
  d) determining a texture metric for the input image or region thereof from at least a portion of the histogram data, wherein the texture metric (T) is determined from:

$$T=\Sigma t^2(m,n)/(N-M); \text{ and}$$

e) thresholding the texture metric to classify the input image or region thereof as one of the two different types.

20. A system for classifying an input image or region thereof, the system comprising:
- an image input subsystem;
- a processing subsystem for processing image data provided by the image input subsystem; and
- software/firmware means operative on the processing subsystem for:
  a) low-pass filtering image data representative of the input image or region thereof to produce low-pass filtered pixel values;
  b) determining a smoothness value for each of a plurality of low-pass filtered pixel values;
  c) generating histogram data from the smoothness values;
  d) determining a texture metric for the input image or region thereof from a subset of the histogram data excluding histogram data associated with edge pixels from the texture metric determination; and
  e) thresholding the texture metric to classify the input image or region thereof.

* * * * *